United States Patent
Adaniya et al.

(10) Patent No.: US 7,432,625 B2
(45) Date of Patent: Oct. 7, 2008

(54) ARMATURE OF MOTOR

(75) Inventors: Taku Adaniya, Kariya (JP); Masatoshi Kobayashi, Kariya (JP); Hiroshi Fukasaku, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 378 days.

(21) Appl. No.: 11/198,835

(22) Filed: Aug. 5, 2005

(65) Prior Publication Data

US 2006/0038459 A1    Feb. 23, 2006

(30) Foreign Application Priority Data

Aug. 19, 2004    (JP)    ............... 2004-239844

(51) Int. Cl.
*H02K 1/16*    (2006.01)
*H02K 3/28*    (2006.01)

(52) U.S. Cl. .................. 310/180; 310/179; 310/207; 310/216; 310/254

(58) Field of Classification Search ................ 310/179, 310/180, 184, 186, 202–209, 216, 254
See application file for complete search history.

(56) References Cited

U.S. PATENT DOCUMENTS 4,583,015 A    4/1986    Toshimitsu ............... 310/187

5,365,132 A * 11/1994 Hann et al. ............... 310/58
2003/0042815 A1 * 3/2003 Kinoshita ............... 310/180

FOREIGN PATENT DOCUMENTS

| GB | 2329528 A | * | 3/1999 |
| JP | 08163799 A | * | 6/1996 |
| JP | 09-121491 | | 5/1997 |
| JP | 09121491 A | * | 5/1997 |

* cited by examiner

*Primary Examiner*—Karl Tamai
*Assistant Examiner*—David W. Scheuermann
(74) *Attorney, Agent, or Firm*—Woodcock Washburn LLP

(57) ABSTRACT

An armature for use in a motor has a plurality of teeth, a plurality of slots and coils of three kinds of phases. A plurality of the slots is formed between the coadjacent teeth. The coils of three phases are wound around the teeth. The armature has a coil structure, according to which radial force acting on a specific tooth is greater than radial force acting on another tooth. A peak value of the radial force acting on the specific tooth is approximated to a peak value of the radial force acting on another tooth in such a manner that a flux path in and/or adjacent to the specific tooth is made narrower than a flux path in and/or adjacent to another tooth.

6 Claims, 4 Drawing Sheets

ARMATURE OF MOTOR

TECHNICAL FIELD

The present invention relates to an armature of a motor, having a plurality of teeth, a plurality of slots and three-phase coils which are wound around the teeth.

Such an armature is disclosed, for example, in Japanese unexamined patent publication No. 9-121491, which has slots in which coils of a single kind of phase are laid and other slots in which coils of a different kind of phases are laid. This armature permits a coil arrangement in which coil end (or protrusion of coil at an end of the armature) is made smaller, for example, in comparison to an armature in which coils of a single kind of phase are laid in each slot.

FIG. 4 illustrates an end view, for example, of a three-phase six-pole armature 101 with 27 slots, as seen from one coil end of the armature 101. A rotor (not shown) is rotated in arrow direction R. In FIG. 4, the solid line indicates a state where the coils LU, LV, LW of respective phases are extended among the slots #1 through #27 on one coil end of the armature 101 (which is the front side of the sheet), while the dotted line indicates a state where the coils LU, LV, LW of respective phases are extended among the slots #1 through #27 on the other coil end of the armature 101 (which is the backside of the sheet).

In FIG. 4, the marking of a cross "X" in a circle "○" denotes the end view of an arrow, indicating a state where the coils LU, LV, LW are extended via the slots #1 through #27 from the front side of the drawing toward the backside thereof, as viewed in the sequence of winding of the coils LU, LV, LW of respective phases (both solid and dotted lines), that is counterclockwise direction in FIG. 4. The marking of double circle "◎" denotes head of the arrow, indicating a state where the coils LU, LV, LW are extended via the slots #1 through #27 from the backside of the drawing toward the front side thereof, as viewed in the sequence of winding of the coils LU, LV, LW of respective phases (both solid and dotted lines), that is counterclockwise direction in FIG. 4.

In the armature 101, only the U-phase coil LU is laid in the slots #1, #5, #10, #14, #19 and #23, only the V-phase coil LV is laid in the slots #4, #8, #13, #17, #22 and #26, and only the W-phase coil LW is laid in the slots #2, #7, #11, #16, #20 and #25. In the slots #3, #12 and #21, both V-phase coil LV and W-phase coil LW are laid. In the slots #6, #15 and #24, both U-phase coil LU and W-phase coil LW are laid. In the slots #9, #18 and #27, both U-phase coil LU and V-phase coil LV are laid.

It is noted that in such a coil structure the number of turns of the coils LU, LV, LW (for example, eight turns) which are laid in the slots #3, #6, #9, #12, #15, #18, #21, #24 and #27 together with coils of a different kind of phases is generally half the number of turns of the coils LU, LV, LW (for example, 16 turns) which are laid in the slots #1, #2, #4, #5, #7, #8, #10, #11, #13, #14, #16, #17, #19, #20, #22, #23, #25, #26. That is, the number of total turns of the coils LU, LV, LW in the slots #1 through #27 is the same.

In the armature 101, however, the peak value of the radial forces acting on the respective teeth *1 through *27 (or the forces acting in the radial direction to deform the armature 101) is not uniform during the operation of the motor, but the peak value of the radial forces acting on some specific teeth (specifically, the teeth *1, *4, *7, *10, *13, *16, *19, *22 and *25) tends to be greater than the radial forces acting on the other teeth.

Referring to FIG. 6 showing a portion of the armature 101 in expansion plan view, the U-phase coil LU (16 turns) laid in the slot #1 and the W-phase coil LW (16 turns) laid in the slot #2 generate magnetic flux in the same direction at the time when the radial force acting on the tooth *1 is at the peak. In the drawing, the direction in which electric current flows in the respective coils LU, LV, LW is indicated by arrows. Accordingly, the peak value of the radial force acting on the tooth *1 is greater due to the generation of magnetic flux in the same direction by the U-phase coil LU and the W-phase coil LW.

On the other hand, the W-phase coil LW (16 turns) laid in the slot #2 and the V-phase coil LV (8 turns) laid in the slot #3 generate magnetic flux in the same direction at the time when the radial force acting on the tooth *2 is at the peak, while the W-phase coil LW (8 turns) laid in the slot #3 generates magnetic flux in the opposite direction at the above time. Since the teeth *1 and *2 have the same dimensions and the same shape and hence the same characteristics of allowing the magnetic flux to pass therethrough easily, the peak value of the radial force acting on the tooth *2 between the adjacent slots #2 and #3 becomes smaller than that of the tooth *1 due to a difference in magnetomotive force of the coils LU, LV, LW, as shown in FIG. 5.

Thus, according to the coil structure which is used by the armature 101, magnetomotive force of the coils LU, LV, LW is different between the specific teeth *1, *4, *7, *10, *13, *16, *19, *22, *25 and the other teeth, and, therefore, the peak value of the radial forces acting on the respective teeth *1 through *27 varies widely from one tooth another, with the result that there has been a problem that noise and/or vibration generated by the motor become large.

It is noted that the above problem does not necessarily occur only in such an armature that mixedly has slots in which coils of a single kind of phase are laid and slots in which coils of different kinds of phases are laid. Similar problem may occur, for example, in the armature having slots in which coils of a single kind of phase are laid because the magnitude of magnetomotive force possibly varies depending on the coil structure.

The present invention is directed to provide an armature for a motor which is capable of regulating the peak value of the radial forces acting on respective teeth.

SUMMARY

In accordance with the present invention, an armature for use in a motor has a plurality of teeth, a plurality of slots and coils of three kinds of phases. A plurality of the slots is formed between the adjacent teeth. The coils are wound around the teeth. The armature has such a coil structure, according to which radial force acting on a specific tooth is greater than radial force acting on another tooth. A peak value of the radial force acting on the specific tooth is approximated to a peak value of the radial force acting on another tooth in such a manner that a flux path in and/or adjacent to the specific tooth is made narrower than a flux path in and/or adjacent to the other teeth.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims.

The invention together with objects and advantages thereof, may best be understood by reference to the following description of the presently preferred embodiments together with the accompanying drawings in which.

DETAILED DESCRIPTION OF THE PREFERRED EMBODIMENTS

Figure 1:
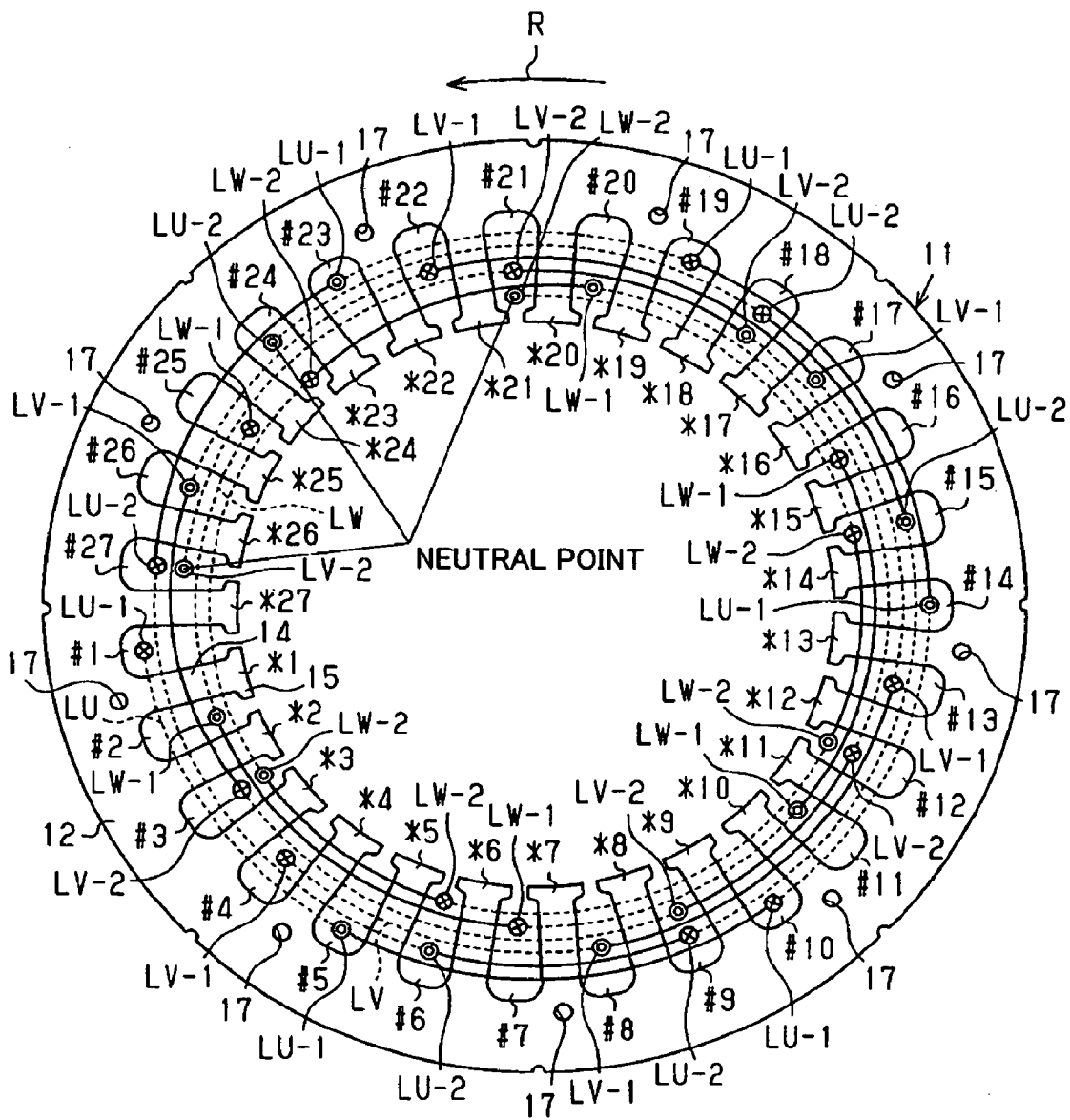
FIG. 1 is a front view of an armature as seen from one coil end according to a preferred embodiment of the present invention.
Figure 2:
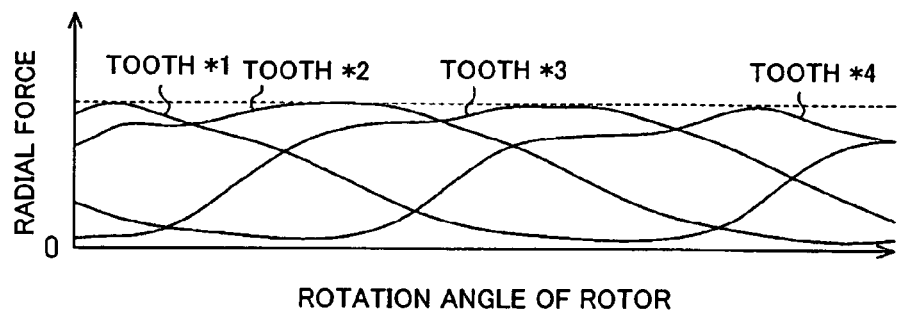
FIG. 2 is a graph showing that variation in the peak value of the radial force is regulated.

The following will describe a preferred embodiment of an armature of the present invention with reference to FIGS. 1 and 2.

FIG. 1 illustrates an armature (stator) 11 used for a motor according to a preferred embodiment of the present invention, as seen from one coil end (protrusion of coils at the end of the armature 11). For the sake of easy understanding of the embodiment, coil structure of the armature 11 is schematically illustrated. It is noted that a rotor (not shown) is rotated in the direction indicated by the arrow R.

The armature 11 has three phases, six poles, 27 slots #1 through #27 and 27 teeth *1 through *27. Coils LU, LV, LW of respective different phases are provided on the teeth *1 through *27. The outer sides of the respective teeth *1 through *27 are connected through a yoke 12. Each of the teeth *1 through *27 includes a body portion 14 which extends radially inwardly from the inner periphery of the yoke 12 and a wide portion 15 which is provided at the radially inner distal end of the body portion 14. It is noted that the reference numerals 14, 15 are affixed to the body portion and the wide portion only for the tooth *1 in FIG. 1. The iron core of the armature 11 (or the yoke 12 and the teeth *1 through *27) is made of a lamination in which a plurality of laminae or thin steel plates is laminated in the axial direction (which is normal to the sheet of FIG. 1 and extends along the axis of rotation of the rotor).

In FIG. 1, the solid line shows a manner in which the coils LU, LV, LW of the respective phases are extended among the slots #1 through #27 as seen from one coil end of the armature 11 (that is the front side of the sheet of FIG. 1), and the dotted line shows a manner in which the coils LU, LV, LW of the respective phases are extended among the slots #1 through #27 as seen from the other coil end of the armature 11 (that is the backside of the sheet of FIG. 1).

In FIG. 1, the marking of a cross "X" in a circle "○" denotes the end view of an arrow, indicating a state where the coils LU, LV, LW are extended through the slots #1 through #27 from the front side of the drawing toward the backside thereof as viewed in the sequence of winding of the coils LU, LV, LW of respective phases (both solid and dotted lines), that is counterclockwise direction in FIG. 1. The marking of double circle "◎" denotes head of the arrow, indicating a state where the coils LU, LV, LW are extended through the slots #1 through #27 from the backside of the drawing toward the front side thereof as viewed in the sequence of winding of the coils LU, LV, LW of respective phases (both solid and dotted lines), that is counterclockwise direction in FIG. 1.

The U-phase coil LU has a first winding portion LU-1 and a second winding portion LU-2. The first winding portion LU-1 is laid in the slots #1, #5, #10, #14, #19, #23 and back to #1, #5 and so forth in this order, and the number of turns in the respective slots #1, #5, #10, #14, #19, #23 is, for example, sixteen.

The second winding portion LU-2 is connected to the first winding portion LU-1 and laid in the slots #27, #6, #9, #15, #18, #24 and back to #27, #6 and so forth in this order together with coils of a different phase LV or LW, and the number of turns in the respective slots #6, #9, #15, #18, #24, #27 is eight which is half the number of turns of the first winding portion LU-1.

The V-phase coil LV has a first winding portion LV-1 and a second winding portion LV-2. The first winding portion LV-1 is laid in the slots #4, #8, #13, #17, #22, #26 and back to #4, #8 and so forth in this order, and the number of turns in the respective slots #4, #8, #13, #17, #22, #26 is, for example, sixteen.

The second winding portion LV-2 is connected to the first winding portion LV-1 and laid in the slots #3, #9, #12, #18, #21, #27 and back to #3, #9 and so forth in this order together with coils of a different phase LU or LW, and the number of turns in the respective slots #3, #9, #12, #18, #21, #27 is eight which is half the number of turns of the first winding portion LV-1.

The W-phase coil LW has a first winding portion LW-1 and a second winding portion LW-2. The first winding portion LW-1 is laid in the slots #25, #2, #7, #11, #16, #20 and back to #25, #2 and so forth in this order, and the number of turns in the respective slots #25, #2, #7, #11, #16, #20 is, for example, sixteen.

The second winding portion LW-2 is connected to the first winding portion LW-1 and laid in the respective slots #24, #3, #6, #12, #15, #21 and back to #24, #3 and so forth in this order together with coils of a different phase LU or LV, and the number of turns in the respective slots #3, #6, #12, #15, #21, #24 is eight which is half the number of turns of the first winding portion LW-1.

Thus, the armature 11 has such a coil structure that the coils of respective phases each include one first winding portion LU-1, LV-1, LW-1 and one second winding portion LU-2, LV-2, LW-2.

As described in the TECHNICAL FIELD, if the teeth *1 through *27 of the armature 11 have the same dimensions and the same shape, the peak value of the radial force (force acting in the radial direction so as to deform the armature 11) is not uniform among the teeth *1 through *27 in the coil structure of the preferred embodiment. In other words, the peak value of the radial forces acting on the specific teeth *1, *4, *7, *10, *13, *16, 19, *22, *25 in which magnetomotive force of the coils LU, LV, LW is large becomes larger than the peak value of the radial forces acting on the other teeth in which magnetomotive force of the coils LU, LV, LW is small (See FIGS. 5 and 6).

As is apparent from FIG. 1, the specific teeth *1, *4, *7, *10, *13, *16, *19, *22, *25 are located between those two adjacent slots in which coils LU, LV or LW of a single kind of phase are laid, respectively. The other teeth are located between those two adjacent slots in one of which coils LU, LV or LW of a single kind of phase are laid and in the other of which coils of two different kinds of phases other than the above coil LU, LV or LW laid in the above two adjacent slots are laid.

In the preferred embodiment, flux paths adjacent to the specific teeth *1, *4, *7, *10, *13, *16, *19, *22, *25 are made narrower than flux paths adjacent to the other teeth by regulating the passing of the flux thereby to reduce the magnetic flux adjacent to the teeth *1, *4, *7, *10, *13, *16, *19, *22, *25. Specifically, circular holes 17 are formed through the yoke 12 adjacent to the proximal portions of the specific teeth *1, *4, *7, *10, *13, *16, *19, *22, *25, respectively, thus making the flux path narrower in comparison to a structure which has no such holes 17 (See FIG. 4). The hole 17 may be formed by drilling after pressing the respective laminae for forming the laminated iron core (the yoke 12 and the teeth *1 through *27).

Figure 4:
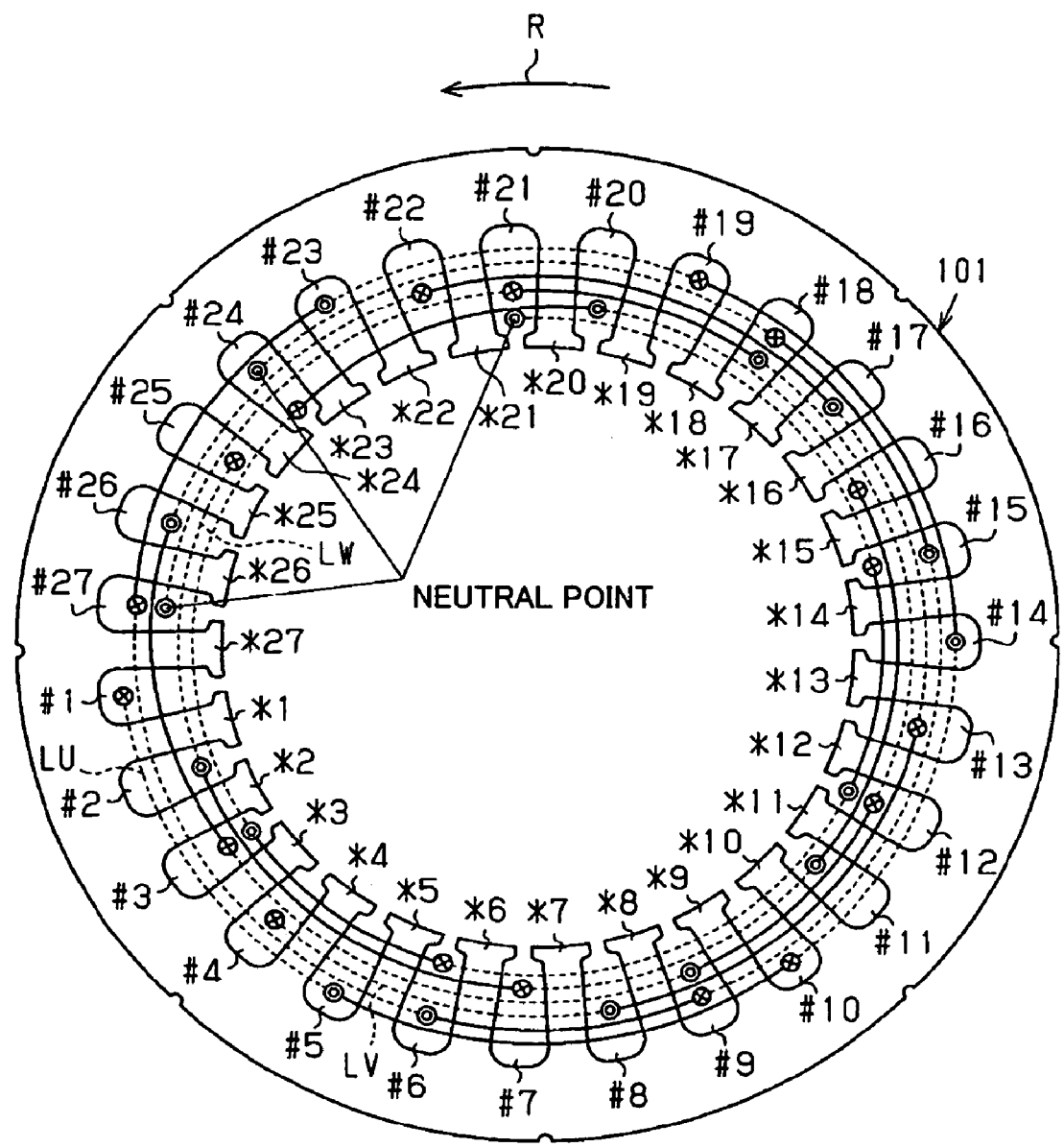
FIG. 4 is a front view of a conventional armature as seen from one coil end.

In the drilling, each hole 17 is formed with an appropriate diameter (the degree of narrowing flux path is appropriately determined) so that the peak value of the radial forces acting on the specific teeth *1, *4, *7, *10, *13, *16, *19, *22, *25 is adjusted to substantially the same peak value of the radial forces acting on the other teeth. Comparison of FIG. 2 which illustrates the radial force of the armature 11 of FIG. 1 with FIG. 5 which illustrates the radial force of the conventional armature 101, FIG. 4 shows that the peak value of the radial forces acting on the specific teeth *1, *4 is approximated to the peak value of the radial forces acting on other teeth *2, *3.

According to the preferred embodiment, the following advantages are obtained.
(1) The variation of peak values of the radial forces acting on the respective teeth *1 through *27 is made uniform by making the flux paths for the specific teeth *1, *4, *7, *10, *13, *16, *19, *22, *25 in the yoke 12 narrower than the flux paths for the other teeth. Accordingly, noise and vibration generated by the motor may be reduced.
(2) The holes 17 are formed in the yoke 12 adjacent to the specific teeth *1, *4, *7, *10, *13, *16, *19, *22, *25, thereby making the flux paths adjacent to such specific teeth narrower than the flux path adjacent to the other teeth. Accordingly, unlike an alternative embodiment shown in FIG. 3, the body portions 14 of the respective teeth *1 through *27 are made with a substantially uniform width. Therefore, the portions corresponding to the specific teeth *1, *4, *7, *10, *13, *16, *19, *22, *25 in the coils LU, LV, LW are prevented from rattling in operation of the armature 11.

Additionally, the holes 17 in the yoke 12 can be easily machined or drilled in comparison to such holes that are directly formed in narrow portions of the iron core such as the body portions 14 or the wide portions 15 of the specific teeth *1, *4, *7, *10, *13, *16, *19, *22. In addition, forming the holes 17 in the portions of the iron core other than the specific teeth *1, 4, *7, *10, *13, *16, *19, *22, *25 prevents a decrease in strength of such specific teeth.

Figure 3:
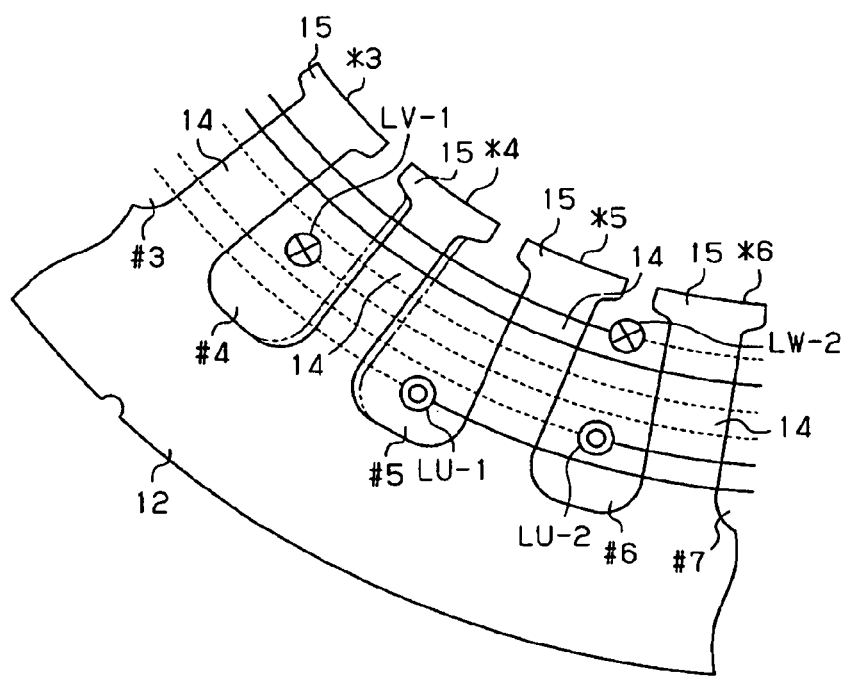
FIG. 3 is a partially enlarged view of a coil end of an armature according to an alternative embodiment.

Furthermore, forming the holes 17 in the iron core (according to the above-described preferred embodiment) and narrowing the body portions 14 of the teeth (according to an alternative embodiment which will be described later with reference to FIG. 3) both lead to a lighter iron core, and hence a lighter motor.
(3) For narrowing the flux paths in the specific teeth *1, *4, *7, *10, *13, *16, *19, *22, *25, it is conceivable that the width of the body portions 14 of the specific teeth *1, *4, *7, *10, *13, *16, *19, *22, *25 is made narrower than the width of the body portion 14 of the other teeth, as shown in FIG. 3 illustrating the alternative embodiment.

Figure 5:
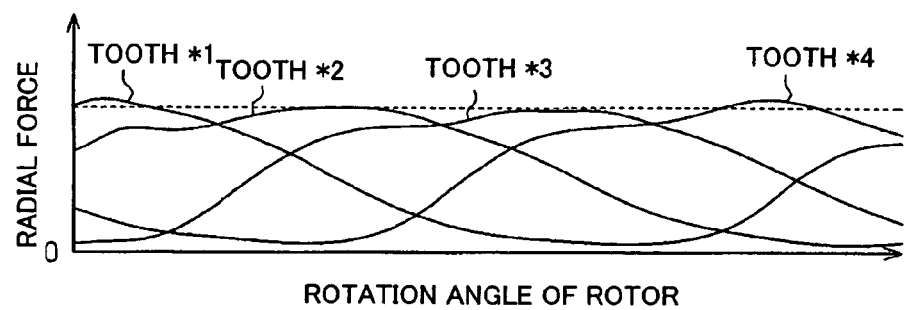
FIG. 5 is a graph showing that the peak value of the radial force is not uniform.
Figure 6:
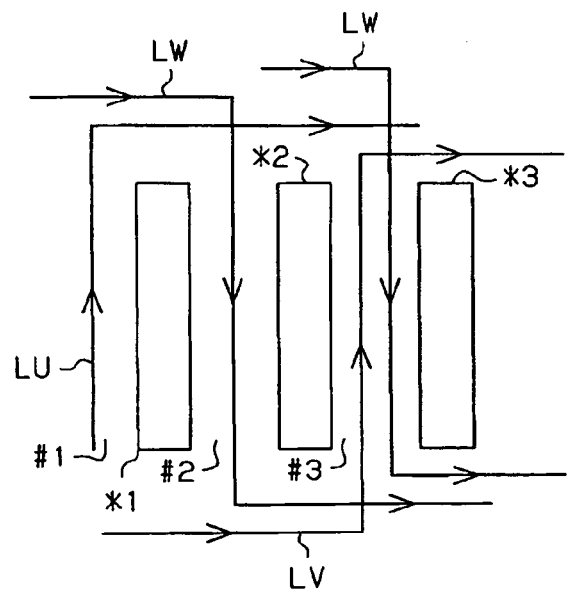
FIG. 6 is a schematic view showing a coil arrangement around a specific tooth and a coil arrangement around another tooth.

However, the peak value of the radial forces acting on the specific teeth *1, *4, *7, *10, *13, *16, *19, *22, *25 in the conventional armature 101 is only about 2 percent greater than the peak value of the radial forces acting on the other teeth (see FIG. 5). In making the armature 11 with the narrowed body portions 14 of the teeth *1 through 27, pressing of the respective laminae to form the laminated iron core (or the yoke 12 and the teeth *1 through *27) should be done with great accuracy, otherwise pressing error or dimensional change of pressing die with time may affect the desired narrowing of the flux paths in the specific teeth *1, *4, *7, *10, *13, *16, *19, *22, *25.

In the preferred embodiment, the holes 17 are drilled after the pressing of the laminae in the yoke 12 at positions adjacent to the specific teeth *1, *4, *7, *10, *13, *16, *19, *22, *25. By so doing, the flux paths adjacent to the specific teeth *1, *4, *7, *10, *13, *16, *19, *22, *25 may be narrowed as desired without being affected by the pressing error or other factors.
(4) The coil structure of the armature 11 mixedly includes slots in which coils of a single kind of phase LU, LV or LW are laid and slots in which coils of two different kinds of phases selected from the coils LU, LV, LW are laid. The armature 11 having such a coil structure, according to which the peak value of the radial forces acting on the respective teeth *1 through *27 tends to vary from one another, is suitable specifically for embodying the present invention.

It is noted that the armature 11 of the motor described with reference to FIGS. 1 and 2 is just an example of embodiment according to the present invention and that the present invention is not limited to the embodiments described above but may be modified within the scope of the present invention. For example, the preferred embodiment may be modified into any one of the following alternative embodiments or the alternative embodiments may be combined with each other as required.

In an alternative embodiment, the armature 11 of the preferred embodiment dispenses with the holes 17 and instead the width of part or the entirety of the body portions 14 of the specific teeth *1, *4, *7, *10, *13, *16, *19, *22, *25 is made narrower than the width of the body portions 14 of the other teeth. Thus, the flux paths in the specific teeth *1, *4, *7, *10, *13, *16, *19, *22, *25 are made narrower than the flux paths in the other teeth. In the alternative embodiment shown in FIG. 3, the width of the body portion 14, for example, of the specific tooth *4 and of other specific teeth *1, *7, *10, *13, *16, *19, *22, *25 (not shown) are made narrower than the width of the body portions 14 of the other teeth.

According to this alternative embodiment, the flux paths of the specific teeth *1, *4, *7, *10, *13, *16, *19, *22, *25 may be made narrower than that of the other teeth merely by pressing the respective laminae to form the laminated iron core, with the result that manufacturing process of the armature 11 may be made simple. This method of narrowing the flux path is advantageous over the method of using a press in forming a small-diameter hole (or the hole 17) in that the maintenance of the desired accuracy of machining by the press is difficult and the serviceable life of pressing die (specifically a needle-like projection for forming the hole 17) is remarkably shortened.

In the embodiment of FIG. 3, good results could be achieved, or the variation of the peak value of radial forces acting on the respective teeth *1 through *27 could be regulated as desired, when the width of the body portions 14 of the specific teeth *1, *4, *7, *10, *13, *16, *19, *22, *25 was made 1.5 to 2.5 percent smaller than that of the other teeth.

In a further alternative embodiment, the preferred embodiment (forming the holes 17) of FIG. 1 and the alternative embodiment shown in FIG. 3 (narrowing the width of the body portions 14) are combined.

In an alternative embodiment, holes are directly formed in the specific teeth *1, *4, *7, *10, *13, *16, *19, *22, *25 (the body portions 14 and/or the wide portions 15) instead of the yoke 12.

In an alternative embodiment, a plurality of holes is formed in the specific teeth *1, *4, *7, *10, *13, *16, *19, *22, *25 or the yoke 12 adjacent to the respective specific teeth *1, *4, *7, *10, *13, *16, *19, *22, *25. In this case, the peak value of the radial forces acting on the specific teeth *1, *4, *7, *10, *13, *16, *19, *22, *25 may be adjusted by changing the number of holes.

In an alternative embodiment, the holes 17 are formed in part of a plurality of laminae forming the laminated iron core in the specific teeth *1, *4, *7, *10, *13, *16, *19, *22, *25 or in the yoke 12 adjacent to the specific teeth *1, *4, *7, *10, *13, *16, *19, *22, *25. Thus, the peak value of the radial forces acting on the specific teeth *1, *4, *7, *10, *13, *16, *19, *22, *25 may appropriately be adjusted by varying the number of laminae through which the holes are to be formed.

In an alternative embodiment, the present invention is acting on an armature in which coils of a single kind of phase are laid in each slot. In other words, the present invention is applicable to an armature of any coil structure having a plurality of teeth whose dimensions are substantially the same wherein the radial force acting on a specific tooth is greater than that acting on the other teeth.

In an alternative embodiment, the present invention may be acting on an armature which includes certain phase coils each having a plurality of first winding portions and a second winding portion.

In an alternative embodiment, the armature according to the present invention is used for a rotor of a motor.

Therefore, the present examples and embodiments are to be considered as illustrative and not restrictive, and the invention is not to be limited to the details given herein but may be modified within the scope of the appended claims.

What is claimed is:

1. An armature for use in a motor, comprising:
   a plurality of teeth;
   a plurality of slots formed between the adjacent teeth; and
   coils of three kinds of phases wound around the teeth, wherein the armature has a coil structure according to which radial force acting on a specific tooth is greater than radial force acting on another tooth, wherein the coil structure mixedly includes the slots in which coils of a single kind of phase are laid and the slots in which coils of a different kind of phase are laid, wherein the specific tooth is adjacent to two slots in which coils of a single kind of phase are laid, and wherein a peak value of the radial force acting on the specific tooth is made uniform with peak values of the radial forces acting on the other teeth of said armature besides said specific tooth by making a flux path in and/or adjacent to the specific tooth narrower than flux paths in and/or adjacent to said other teeth.

2. The armature according to claim 1, further comprising:
   a yoke which connects outer sides of the plurality of teeth, wherein the specific tooth is made narrower in flux path than another tooth in such a manner that a hole is formed in the specific tooth and/or in the yoke adjacent to the specific tooth.

3. The armature according to claim 2, wherein the teeth all have the same dimensions and the same shape.

4. The armature according to claim 1, further comprising:
   a yoke which connects outer sides of a plurality of the teeth, wherein each tooth has a body portion extending radially inwardly from the yoke and a wide portion provided at a distal end of the body portion, wherein the specific tooth is made narrower in flux path than another tooth in such a manner that a width of the body portion of the specific tooth is partially or wholly made smaller than a width of the body portion of another tooth.

5. An iron core for use in an armature of a motor, comprising:
   a plurality of teeth;
   a plurality of slots formed between adjacent teeth; and
   a yoke which connects outer sides of a plurality of the teeth, wherein a specific tooth in a plurality of the teeth is made narrower in flux path than other teeth besides said specific tooth in such a manner that a hole is formed in the specific tooth and/or in the yoke adjacent to the specific tooth whereby a peak value of the radial force acting on the specific tooth is made uniform with peak values of the radial forces acting on the other teeth besides said specific tooth, wherein the core mixedly includes the slots in which coils of a single kind of phase are laid and the slots in which coils of a different kind of phase are laid, wherein the specific tooth is adjacent to two slots in which coils of a single kind of phase are laid.

6. An iron core for use in an armature of a motor, comprising:
   a plurality of teeth;
   a plurality of slots formed between adjacent teeth; and
   a yoke which connects outer sides of a plurality of the teeth, wherein each has a body portion radially inwardly extending from the yoke and a wide portion provided at a distal end of the body portion, and wherein a specific tooth in a plurality of the teeth is made narrower in flux path than the other teeth besides said specific tooth in such a manner that a width of the body portion of the specific tooth is partially or wholly made smaller than a width of the body portion of said other teeth whereby a peak value of the radial force acting on the specific tooth is made uniform with peak values of the radial forces acting on the other teeth besides said specific tooth, wherein the core mixedly includes the slots in which coils of a single kind of phase are laid and the slots in which coils of a different kind of phase are laid, wherein the specific tooth is adjacent to two slots in which coils of a single kind of phase are laid.

* * * * *